US006939467B2

(12) United States Patent
Deichmann et al.

(10) Patent No.: US 6,939,467 B2
(45) Date of Patent: Sep. 6, 2005

(54) FILTER MODULE FOR A FUEL CONVEYING UNIT AND FUEL CONVEYING UNIT FOR A MOTOR VEHICLE

(75) Inventors: Johannes Deichmann, Alheim-Sterkelshausen (DE); Peter Marx, Wasbüttel (DE); Peter Schuchardt, Rotenburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/363,939

(22) PCT Filed: Aug. 16, 2001

(86) PCT No.: PCT/DE01/03141

§ 371 (c)(1), (2), (4) Date: Sep. 30, 2003

(87) PCT Pub. No.: WO02/20974

PCT Pub. Date: Mar. 14, 2002

(65) Prior Publication Data

US 2004/0050370 A1 Mar. 18, 2004

(30) Foreign Application Priority Data

Sep. 9, 2000 (DE) ........................................ 100 44 610

(51) Int. Cl.[7] ........................ F02M 37/22; B01D 35/02
(52) U.S. Cl. .................................................. 210/416.4
(58) Field of Search ........................... 210/416.1, 416.4, 210/459, 460, 484, 488, 489; 123/495, 509

(56) References Cited

U.S. PATENT DOCUMENTS

| | | | | |
|---|---|---|---|---|
| 2,834,298 A | * | 5/1958 | Wright et al. | 210/416.4 |
| 3,561,604 A | * | 2/1971 | Yotsumoto | 210/484 |
| 3,912,423 A | * | 10/1975 | Pfabe | 417/313 |
| 4,145,285 A | * | 3/1979 | Martin et al. | 210/100 |
| 5,392,750 A | | 2/1995 | Laue et al. | |
| 5,452,701 A | | 9/1995 | Tuckey | |
| 5,766,468 A | * | 6/1998 | Brown et al. | 210/323.2 |
| 5,960,775 A | | 10/1999 | Tuckey | |
| 6,029,633 A | | 2/2000 | Brandt | |
| 6,358,412 B1 | * | 3/2002 | Strohl et al. | 210/172 |

FOREIGN PATENT DOCUMENTS

| | | |
|---|---|---|
| DE | 83 17 023.5 | 10/1983 |
| DE | 39 38 686 C2 | 5/1991 |
| DE | 44 43 621 A1 | 6/1995 |
| DE | 199 46 024 A1 | 7/2000 |
| DE | 100 54 590 | 7/2001 |

OTHER PUBLICATIONS

German Office Action dated Mar. 22, 2004 for German Application 100 44 610.8.

* cited by examiner

*Primary Examiner*—Fred G. Prince
(74) *Attorney, Agent, or Firm*—Morrison & Foerster LLP

(57) ABSTRACT

The invention relates to a filter module (23) for a fuel conveying unit (2) comprising a fuel pump (5) with two pump chambers (20, 21) which are independent of each other. A common filter area (24) is provided for the inlet areas (16, 17) of the pump chambers (20, 21). The filter module (23) has a connector (25) which can be inserted into a recess of a housing part (7). The configuration of the filter module (23) is particularly economical as a result.

7 Claims, 2 Drawing Sheets

FILTER MODULE FOR A FUEL CONVEYING UNIT AND FUEL CONVEYING UNIT FOR A MOTOR VEHICLE

CLAIM FOR PRIORITY

This application claims priority to PCT application No. PCT/DE01/03141, filed Aug. 16, 2001 and published in the German language, which application claims benefit to German application DE 100 44 610.8, filed Sep. 9, 2000 in the German language.

TECHNICAL FIELD OF THE INVENTION

The invention relates to a filter module for a fuel-conveying unit of a motor vehicle, in which the fuel-conveying unit features a fuel pump with at least two inlet areas and two pump chambers which are independent of each other. The invention also relates to a fuel-conveying unit for a motor vehicle with a fuel pump comprising at least two pump chambers, each having an inlet area for the pump chambers and a filter module for filtering the fuel flowing into the inlet areas.

BACKGROUND OF THE INVENTION

In the fuel-conveying units currently used in modem motor vehicles, filter modules with one filter cloth for each of the inlet areas are used at the feed pump. One of the pump chambers is generally used to convey fuel from a surge tank to an internal combustion engine of the motor vehicle. The second pump chamber, which is separated from the first pump chamber, is used to convey fuel into the surge tank. By means of the sucking jet pump, fuel is conveyed from the fuel tank into the surge tank. The filter cloth can feature a mesh width intended for the respective application.

A disadvantage of the known filter module is that its production is cost-intensive and requires costly assembly. As a result, the fuel-conveying unit with the filter module is also very expensive to build.

SUMMARY OF THE INVENTION

The invention discloses a filter module of the type initially described such that it can be manufactured in a cost-effective manner, and a fuel-conveying unit with a very simple design.

In one embodiment of the invention, a common filter area for both inlet areas is provided.

With this design, the filter module requires a particularly low assembly cost for the filter area. Hence, the filter area can be produced in one piece for both inlet areas and is particularly cost-effective. Furthermore, the two filter areas can be quite easily assembled in one work process.

According to another embodiment of the invention, interaction between the flows into the inlet areas can easily be avoided by separating the inlet areas from each other at a point behind the common filter area, as seen from the direction of flow.

According to still another embodiment of the invention, different degrees of filtration of the fuel flows supplied to the pump chambers can be generated with ease if one of several filter areas with different pore sizes arranged on top of each other covers only one of the inlet areas. With this design, the filter area covering the one inlet area can be provided with a particularly small pore size. As a result, the fuel supplied to that inlet area includes fewer dirt particles than the fuel supplied to the other inlet area.

The filter module according to the invention, in one embodiment, features a separate connector for each of the inlet areas. However, the design of the filter module according to the invention is particularly simple if it has one connector for both inlet areas.

The invention also builds a fuel-conveying unit with a particularly simple design by using a filter module that has a common filter area connected to both inlet areas of the fuel pump.

With this design, the fuel-conveying unit is especially compact and requires a particularly small number of components to be assembled. As a result of the invention, an expensive attachment of several filter areas to the feed pump is avoided. Consequently, the design of the fuel-conveying unit is especially simple.

According to yet another embodiment of the invention, an improper assembly or a misalignment of the filter module with the fuel pump can be easily avoided if a housing part featuring the inlet areas and a connector of the filter module both feature round cross-sections for the inlet areas and if the cross sections overlap.

According to another embodiment of the invention, interaction between the flows in the inlet areas can be avoided if the housing part has a partition up to the housing of the filter module.

BRIEF DESCRIPTION OF THE DRAWINGS

The invention is described below in detail with reference to the drawings, in which.

DETAILED DESCRIPTION OF THE INVENTION

Figure 1:
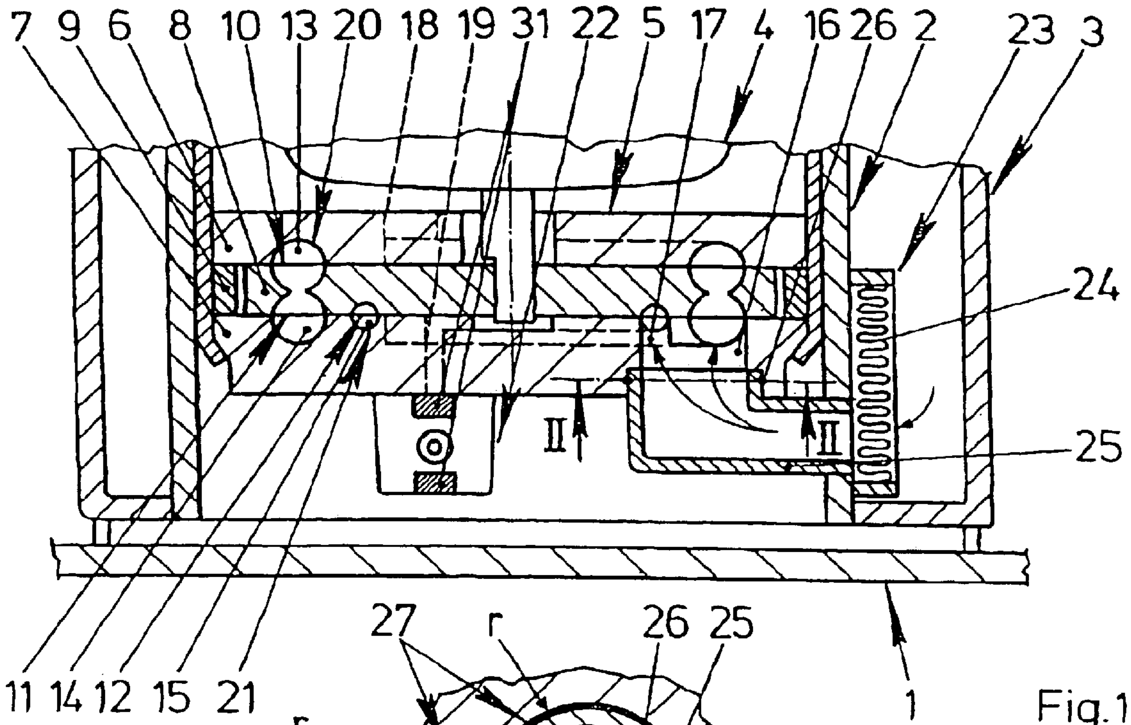
FIG. 1 depicts a schematic view of a fuel conveying unit inserted into a surge tank, in longitudinal section.

FIG. 1 schematically depicts, in longitudinal section, the area of a fuel-conveying unit 2 facing the floor of a fuel tank 1. The fuel-conveying unit 2 is mounted inside a surge tank 3 and features a fuel pump 5 driven by an electric motor 4. The fuel pump 5 has an impeller 8 that rotates between two housing parts 6, 7. The housing parts 6, 7 are kept spaced apart by means of a distance ring 9. The impeller 8 features several rings 10–12 of guide blades delimiting blade chambers. In the housing parts 6, 7, partially annular channels 13–15 are arranged opposite each of the rings 10–12. The partially annular channels 13–15 and the blade chambers form individual pump chambers 20, 21 extending from inlet areas 16, 17 to outlet areas 18, 19. Thus, the fuel pump 5 operates in accordance with the principle of the lateral channel pump. The innermost of the pump chambers 21 serves to supply a sucking jet pump 22 depicted in FIG. 3 with fuel. The radial outer rings 10, 11 of the blade chambers are linked to each other and form, together with the corresponding partially annular channels 13, 14, a single pump chambers 20 for pumping fuel to an internal combustion engine (not depicted) of the motor vehicle.

Figure 2:
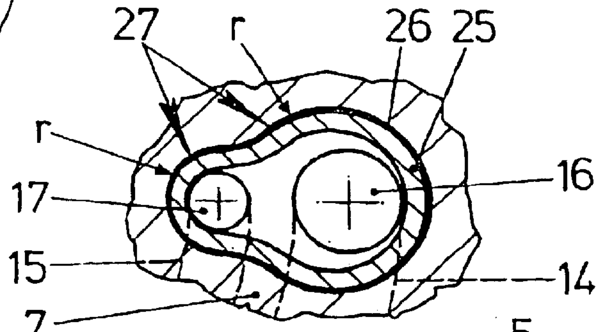
FIG. 2 depicts a sectional view through a connector of a filter module of the fuel-conveying unit from FIG. 1 along line II—II.
Figure 3:
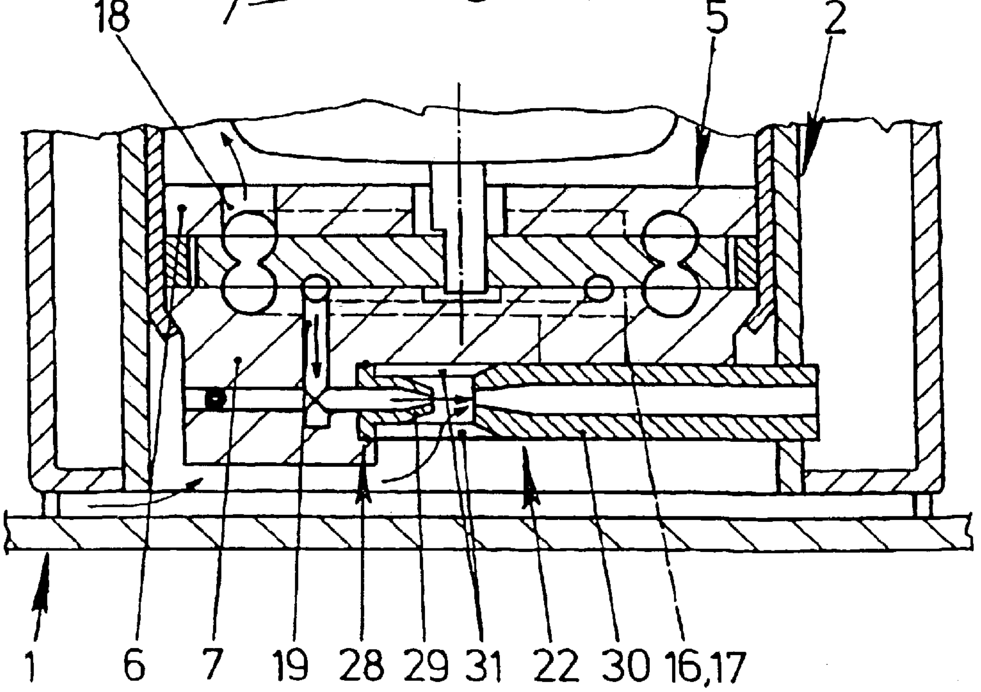
FIG. 3 depicts a sectional view through the fuel-conveying unit from FIG. 1 in the area of a sucking jet pump.

The fuel-conveying unit 2 comprises a filter module 23 for both inlet areas 16, 17, with a common filter area 24 located in the surge tank 3. The filter area 24 may, for example, be a filter cloth with a specific mesh width. The filter area 24 may also feature several filter cloths with various mesh widths arranged on top of each other, so that the fuel is first filtered coarsely and then finely. The filter area 24 is located on a connector 25. The connector is inserted into the housing part 7 featuring the inlet areas 16, 17 and sealed by means of a gasket 26. FIG. 2 depicts the connection of the connector 25 with the housing part 7 in the area of the gasket 26, in a sectional view along line II—II from FIG. 1. It can be seen that the housing part 7 features recesses 27 with a radius r at the inlet areas 16, 17, and that the radii overlap. The connector 25 is shaped accordingly and is inserted into the recess 27. FIG. 3 depicts a sectional view through the fuel-conveying unit 2 from FIG. 1 in the area of the sucking jet pump 22. The housing part 7 featuring the inlet areas 16, 17 has a receptacle 28 for the sucking jet pump 22. The sucking jet pump 22 is produced in one piece with a nozzle 29 and a mixing tube 30, and is inserted into the receptacle 28. The mixing tube 30 and the nozzle 29 are connected to each other through studs 31. The mixing tube 30 is extended to the surge tank 3. During operation of the fuel pump 5, fuel is sucked out of the surge tank 3, through the filter module 23 depicted in FIG. 1, and conveyed through the radial inner pump chamber 21 to the nozzle 29 of the sucking jet pump 22. The sucking jet pump 22 sucks fuel out of the fuel tank 1 and pumps it into the surge tank 3. To show this more clearly, the fuel flows are indicated in the drawing by arrows.

Figure 4:
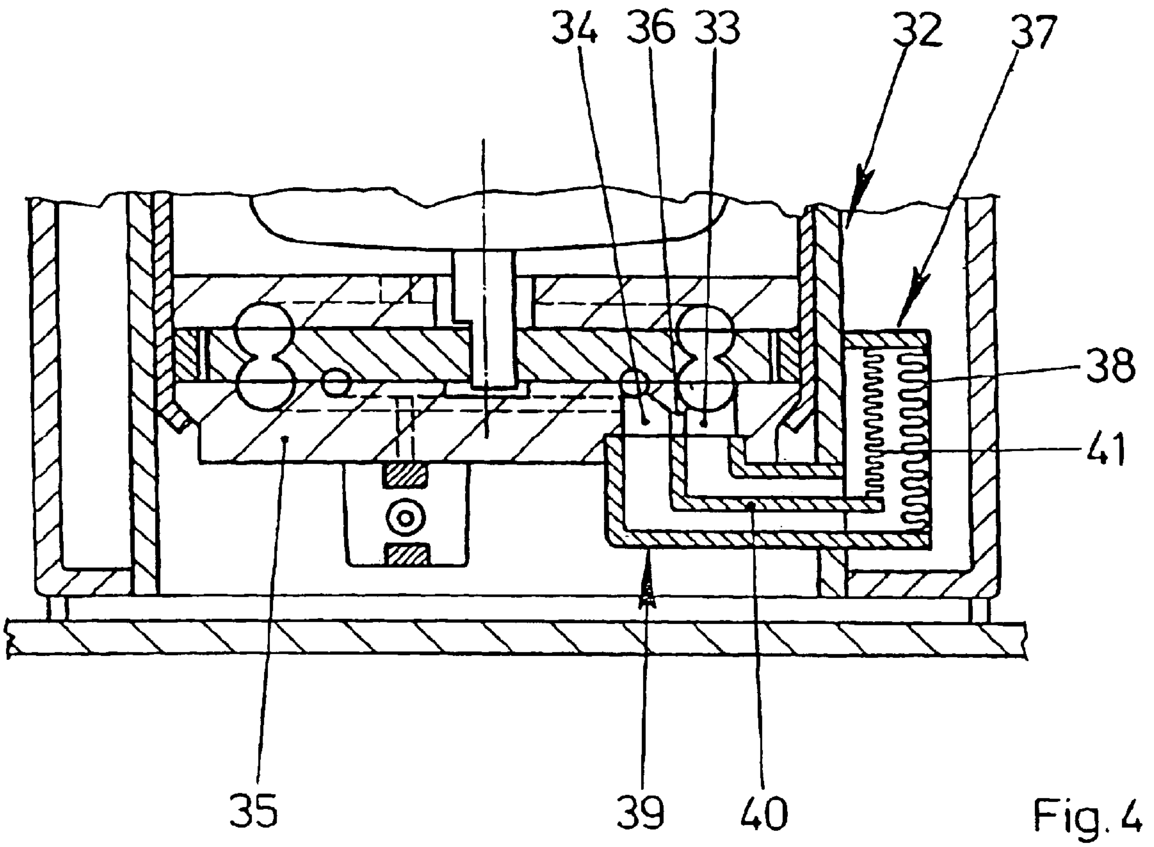
FIG. 4 depicts another embodiment of the fuel-conveying unit, in longitudinal section.

FIG. 4 depicts another embodiment of the fuel-conveying unit 32 according to the invention in longitudinal section. It differs from that depicted in FIG. 1 mainly in that the inlet areas 33, 34 are separated from one another by a partition 36 located in a housing part 35. A filter module 37 with a common filter area 38 also features a partition 40 in a connector 39. This partition 40 extends from the housing part 35 to a second filter area 41.

This second filter area 41 is located behind the common filter area 38 when seen from the direction of flow, and features a particularly small pore size. Therefore, the common filter area 38 provides coarse filtration, while the second filter area 41 is intended for fine filtration of the fuel supplied to the internal combustion engine.

What is claimed is:

1. A filter module for a fuel conveying unit of a motor vehicle, in which the fuel-conveying unit comprising a fuel pump with at least two inlet areas and two pump chambers which are independent of each other, wherein a common filter area is provided for both inlet areas.

2. The filter module according to claim 1, wherein the inlet areas are separated from one another behind the common filter areas, as viewed from a direction of flow.

3. The filter module according to claim 1, wherein one filter area of several filter areas with different pore sizes arranged on top of each other covers one of the inlet areas.

4. The filter module according to claim 1, further comprising a single connector for both inlet areas.

5. A fuel-conveying unit for a motor vehicle with a fuel pump comprising at least two pump chambers, each having an inlet area for the pump chambers and a filter module for filtering fuel flowing into the inlet areas, wherein the filter module includes a common filter area connected with both inlet areas of the fuel pump.

6. The fuel-conveying unit according to claim 5, further comprising a housing part having the inlet areas and a connector of the filter module having round cross-sections for the inlet areas, such that the cross-sections overlap.

7. The fuel-conveying unit according to claim 5, wherein a housing part includes a partition extending to a connector of the filter module.

* * * * *